US006506532B2

(12) United States Patent
Akai et al.

(10) Patent No.: US 6,506,532 B2

(45) Date of Patent: Jan. 14, 2003

(54) TONER FOR THE DEVELOPMENT OF ELECTROSTATIC IMAGE AND PROCESS FOR THE PREPARATION THEREOF

(75) Inventors: Hideko Akai, Kanagawa (JP); Noriaki Takahashi, Kanagawa (JP); Yuqing Xu, Kanagawa (JP); Tomohiro Yamazaki, Kanagawa (JP); Masahiro Nukui, Mie (JP); Kazunori Maruyama, Mie (JP); Takashi Kokubo, Mie (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 09/756,124

(22) Filed: Jan. 9, 2001

(65) Prior Publication Data

US 2002/0006569 A1 Jan. 17, 2002

Related U.S. Application Data

(62) Division of application No. 09/338,578, filed on Jun. 23, 1999.

(30) Foreign Application Priority Data

Jun. 24, 1998 (JP) .......................................... 10-176975
Apr. 2, 1999 (JP) .......................................... 11-095993

(51) Int. Cl.$^7$ ................................................ C08J 3/215

(52) U.S. Cl. ........................... 430/137.14; 430/137.17; 523/335

(58) Field of Search ................................ 430/137, 110, 430/109, 137.14, 137.17; 523/335

(56) References Cited

U.S. PATENT DOCUMENTS

| | | | | |
|---|---|---|---|---|
| 4,254,201 | A | | 3/1981 | Sawai et al. |
| 4,421,660 | A | * | 12/1983 | Solc ........................ 252/62.54 |
| 4,996,127 | A | | 2/1991 | Hasegawa et al. |
| 5,698,223 | A | * | 12/1997 | Mychajlowskij et al. ... 430/137 |
| 5,702,860 | A | | 12/1997 | Koyama et al. |
| 5,965,316 | A | | 10/1999 | Kmiecik-Lawrynowicz et al. |
| 5,994,020 | A | * | 11/1999 | Patel et al. ................. 430/137 |
| 6,132,924 | A | * | 10/2000 | Patel et al. ............ 430/137.14 |

FOREIGN PATENT DOCUMENTS

| | | |
|---|---|---|
| JP | 60-220358 | 5/1985 |
| JP | 7-64335 | 10/1995 |
| JP | 8-59840 | 5/1996 |

* cited by examiner

*Primary Examiner*—Christopher Rodee
(74) *Attorney, Agent, or Firm*—Oblon, Spivak, McClelland, Maier & Neustadt, P.C.

(57) ABSTRACT

The present invention provides a process for the preparation of a novel toner satisfying a high resolution, a low temperature fixability and a high offset resistance at a low cost. A novel toner for the development of an electrostatic image is provided comprising an agglomerate of particles containing at least primary polymer particles, wherein said primary polymer particles substantially comprise a wax encapsulated therein.

10 Claims, No Drawings

TONER FOR THE DEVELOPMENT OF ELECTROSTATIC IMAGE AND PROCESS FOR THE PREPARATION THEREOF

This application is a divisional of prior application U.S. Ser. No. 09/338,578, filed Jun. 23, 1999, pending.

FIELD OF THE INVENTION

The present invention relates to a toner for the development of an electrostatic image for use in electrophotographic process copying machines and printers. More particularly, the present invention relates to a toner for the development of an electrostatic image having excellent fixability, offset resistance and blocking resistance which can provide an image with a good OHP transparency.

BACKGROUND OF THE INVENTION

A toner for the development of an electrostatic image which has heretofore been widely used in electrophotography is prepared by a process which comprises melt-kneading a mixture of a styrene-acrylate copolymer, a colorant such as carbon black and pigment, a charge control agent and/or a magnetic material through an extruder, crushing the material, and then classifying the powder. However, the conventional toner obtained by the foregoing melt-kneading/crushing process is disadvantageous in that the controllability of the particle diameter of the toner is limited, making it difficult to prepare a toner substantially having an average particle diameter of not more than 10 μm, particularly not more than 8 μm in a good yield. Thus, the conventional toner cannot be considered good enough to realize a high resolution which will be required in the future electrophotography.

Further, from the standpoint of reduction of energy required, it has been desired to provide a toner having a good low temperature fixability. To this end, an approach involving the blend of a low softening wax in a toner during kneading has been proposed. In the kneading/crushing process, however, the amount of such a wax to be blended in 100 parts of the resin is limited to about 4 to 5 parts. Thus, toners having a sufficient low temperature fixability cannot be obtained.

In an attempt to eliminate these difficulties, JP-A-60-220358 (The term "JP-A" as used herein means an "unexamined published Japanese patent application") and JP-A-60-225170 propose a process for the preparation of a particulate toner which involves emulsion polymerization in the presence of a colorant, followed by salting out of the emulsion polymer solution under predetermined conditions. Further, JP-A-2-616650 proposes a process which involves the mixing of an emulsion polymer solution with a dispersion of colorant, followed by coagulation of particles by salting out. According to these processes, the particles obtained at the agglomeration step have a particle diameter of not more than 25 μm and thus can provide a particulate toner without passing through crushing step. However, these processes leave something to be desired in the control over the particle diameter distribution. Thus, a classification step is indispensable. Further, these processes are disadvantageous in that the yield of a toner having a desired particle diameter is poor.

In an attempt to overcome the forgoing difficulty in controlling the particle diameter and particle diameter distribution and hence realize a high resolution, JP-A-63-186253 proposes a process for the preparation of a toner involving emulsion polymerization/two-stage agglomeration process. However, this process, too, is limited in the amount of a wax to be introduced into the agglomeration step. Thus, this process leaves something to be desired in the improvement in low temperature fixability.

A process disclosed in JP-A-6-329947 involves the addition of an organic solvent infinitely soluble in water at the same time with a flocculating agent at the agglomeration step which allows the formation of aggregates having a narrow particle diameter distribution. However, this process is disadvantageous in that it has many factors to be controlled and hence shows a poor reproducibility. This process is also disadvantageous in that it gives a great burden of disposal of waste water..

SUMMARY OF THE INVENTION

It is therefore an object of the present invention to overcome the difficulties of the conventional toner for the development of an electrostatic image and hence provide a process for the preparation of a novel toner satisfying a high resolution, a low temperature fixability and a high offset resistance at a low cost.

The object of the present invention will become more apparent from the following detailed description and examples.

The inventors made extensive studies of the foregoing objects. As a result, it was found that the use of primary polymer particles obtained by the emulsion polymerization of monomers in the presence of a wax emulsion as a seed makes it possible to solve the foregoing problems. The present invention has thus been worked out.

The essence of the present invention lies in a toner for the development of an electrostatic image comprising an agglomerate of particles containing at least primary polymer particles, wherein said primary polymer particles substantially comprise a wax encapsulated therein and a process for the preparation of a toner for the development of an electrostatic image which comprises a first step of subjecting a monomer mixture containing a monomer having an acidic or basic polar group to seeded emulsion polymerization in the presence of a particulate wax as a seed, a second step of mixing a dispersion of primary polymer particles thus obtained with a dispersion of particulate colorant, and a third step of causing the mixture of dispersions to be agglomerated to form aggregates.

DETAILED DESCRIPTION OF THE INVENTION

The present invention will be further described hereinafter.

As the wax to be used as a seed there may be any known wax. Examples of such a wax include olefinic wax such as low molecular weight polyethylene, low molecular weight polypropylene and polyethylene copolymer, paraffin wax, ester-based wax having long-chain aliphatic group such as behenyl behenate, montanic acid ester and stearyl stearate, vegetable wax such as hydrogenated castor oil carbanauba wax, ketone having long-chain alkyl group such as distearyl ketone, silicone having alkyl side group, higher fatty acid such as stearic acid, long-chain fatty acid alcohol, long-chain fatty acid-based polyvalent alcohol such as pentaerythritol, partial esterification product thereof, and higher fatty acid amide such as oleic acid amide and stearic acid amide.

Among these waxes, those having a melting point of not higher than 100° C., preferably from 40° C. to 90° C., particularly from 50° C. to 80° C., are preferably used to improve the fixability of the toner. If the melting point of the wax exceeds 100° C., the resulting effect of lowering the fixing temperature of the toner is poor.

The particulate wax employable herein can be obtained by the emulsification of the foregoing wax in the presence of at least an emulsifying agent selected from the group consisting of known cationic surface active agents, anionic surface active agents and nonionic surface active agents. Two or more of these surface active agents may be used in combination.

Specific examples of the cationic surface active agent employable herein include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide.

Specific examples of the anionic surface active agent employable herein include fatty acid soap such as sodium stearate and sodium dodecanate, sodium dodecylsulfate, sodium dodecylbenzene sulfonate, and lauryl sodium sulfate.

Specific examples of the nonionic surface active agent employable herein include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoylsuccrose.

In the present invention, these waxes are dispersed in the presence of an emulsifying agent to produce an emulsion which is then used for the seeded polymerization of resin. The average particle diameter of the wax emulsion is preferably from 0.01 $\mu$m to 3 $\mu$m, more preferably from 0.03 $\mu$m to 1 $\mu$m, particularly from 0.05 to 0.8 $\mu$m. For the measurement of average particle diameter, Microtrack UPA produced by NIKKISO CO., LTD. may be used. If the average particle diameter of the wax emulsion exceeds 3 $\mu$m, the polymer particles obtained by seeded polymerization have too large an average particle diameter to provide a toner which can give a high resolution. On the contrary, if the average particle diameter of the emulsion falls below 0.01 $\mu$m, the primary polymer particles obtained by seeded polymerization have too low a wax content to sufficiently exert the effect of wax.

In order to effect seeded emulsion polymerization in the presence of the wax emulsion, a monomer having a polar group (monomer having an acidic or basic functional group) and other monomers are successively added to cause polymerization in the emulsion particle containing wax. During this procedure, these monomers may be separately added. Alternatively, a plurality of monomers may be previously mixed before added. Further, the composition of monomers to be added may be changed during addition. Moreover, these monomers may be added as they are or in the form of emulsion obtained by mixing with water and a surface active agent. As such a surface active agent there may be used one or more of the previously exemplified surface active agents.

During the progress of seeded emulsion polymerization, an emulsifying agent may be added to the wax emulsion in a predetermined amount. The polymerization initiator may be added before, at the same time with or after the addition of the monomers. These addition methods may be employed in combination.

Examples of the monomer having an acidic polar group employable herein include monomers having carboxylic group such as acrylic acid, methacrylic acid, maleic acid, fumaric acid and cinnamic acid, and monomers having sulfonic acid group such as sulfonated styrene.

Examples of the monomer having a basic polar group include aminostyrene and a quaternary ammonium salt thereof, monomers containing nitrogen-containing heterocycles such as vinylpyridine and vinylpyrrolidone, (meth) acrylic acid esters having amino group such as dimethylaminoethyl acrylate and diethylaminoethyl methacrylate, (meth) acrylic acid esters having ammonium salt obtained by quaterizing these amino groups, acrylamide, N-propylacrylamide, N, N-dimethylacrylamide, N, N-dipropylacrylamide, N, N-dibutylacrylamide.

Examples of the other comonomers employable herein include styrenes such as styrene, methylstyrene, chlorostyrene, dichlorostyrene, p-tert-butylstyrene, p-n-butylstyrene and p-n-nonylstyrene, and (meth) acrylic acid esters such as methyl acrylate, ethyl acrylate, propyl acrylate, n-butyl acrylate, isobutyl acrylate, hydroxyethyl acrylate, ethylhexyl acrylate, methyl methacrylate, ethyl methacrylate, propyl methacrylate, n-butyl methacrylate, isobutyl methacrylate, hydroxyethyl methacrylate and ethylhexyl methacrylate. Particularly preferred among these comonomers are styrene, butyl acrylate, etc.

These monomers may be used singly or in admixture. These monomers are preferably added such that the resulting polymer exhibits a glass transition temperature of from 40° C. to 80° C. If the glass transition temperature of the polymer exceeds 80° C., the resulting toner exhibits too high a fixing temperature. Further, the resulting OHP transparency can be likely deteriorated. On the contrary, if the glass transition temperature of the polymer falls below 40° C., the storage stability of the resulting toner is deteriorated to an extent such that problems can occur. As the monomer having an acidic polar group employable herein there is preferably used acrylic acid. As the other monomers employable herein there are preferably used styrene, acrylic acid ester and methacrylic acid ester.

Examples of the polymerization initiator employable herein include persulfates such as potassium persulfate, sodium persulfate and ammonium persulfate, redox initiators obtained by combining these persulfates as one component with reducing agents such as acidic sodium sulfite, initiators such as hydrogen peroxide, benzoyl peroxide, t-butyl hydroperoxide and cumene hydroperoxide, redox initiators obtained by combining these initiators as one component with reducing agents such as ferrous salt, 4, 4'-azobiscyanovaleric acid, and 2,2'-azobis-isobutylonitrile. These polymerization initiators may be added before, at the same time with or after the addition of the monomers. These addition methods may be employed in combination.

In the present invention, any known chain transfer agent may be used as necessary. Specific examples of such a chain transfer agent include t-dodecyl mercaptan, 2-mercaptoethanol, diisopropyl xanthogen, carbon tetrachloride, and trichlorobromomethane. These chain transfer agents may be used singly or in combination. These chain transfer agents may be used in an amount of from 0 to 5% by weight based on the weight of the polymerizable monomers used.

The dispersion of primary polymer particles obtained at the first step contains primary polymer particles substantially having a wax encapsulated therein. Referring to the morphology of the primary polymer particles, they may be of core-shell type, phase separation type, occlusion type or the like. Alternatively, the primary polymer particles may be in the form of mixture of these morphologies. A particularly preferred morphology is core-shell type. The morphology of the primary polymer particles can be confirmed by observing a section of the particle under an electron microscope. The wax is normally used in an amount of from 1 to 40 parts by weight, preferably from 2 to 35 parts by weight, more preferably from 5 to 30 parts by weight based on 100 parts by weight of the binder resin used. Components other than wax such as pigment and charge control agent may be further used as a seed so far as they don't depart from the scope of the present invention.

The average particle diameter of the primary polymer particles is normally from 0.05 μm to 3 μm, preferably from 0.1 μm to 1 μm, more preferably from 0.1 μm to 0.5 μm. If the average particle diameter of the primary polymer particles falls below 0.05 μm, the agglomeration rate can be hardly controlled to disadvantage. On the contrary, if the average particle diameter of the primary polymer particles exceeds 3 μm, the particle diameter of the particulate toner obtained by agglomeration is too great to provide a toner having a high resolution.

At the second step, the dispersion of primary polymer particles and the dispersion of colorant are mixed. Preferably, the dispersion of primary polymer particles is mixed with the dispersion of colorant, followed by the addition of an electrolyte in a predetermined amount.

As the colorant employable herein there may be used any of inorganic or organic pigments and organic dyes, in combination as necessary.

Specific examples of such a colorant include known dyes and pigments such as carbon black, aniline blue, phthalocyanine blue, phthalocyanine green, hansa yellow, rhodamine dye or pigment, chrome yellow, quinacridone, benzidine yellow, rose bengal, triallylmethane dye, monoazo dye or pigment, disazo dye or pigment, and condensed azo dye or pigment. These dyes or pigments may be used singly or in admixture. If the toner of the present invention is a full-color toner, benzidine yellow, monoazo dye or pigment or condensed azo dye or pigment is preferably used as a yellow dye or pigment, quinacridone dye or pigment or monoazo dye or pigment is preferably used as a magenta dye or pigment, and phthalocyanine blue is preferably used as a cyan dye or pigment.

The colorant is normally used in an amount of from 3 to 20 parts by weight based on 100 parts by weight of the binder resin used. The colorant, too, is used in the form of emulsion obtained by emulsifying in water in the presence of the foregoing known emulsifying agent. The average particle diameter of the colorant employable herein is preferably not more than 3 μm. If the average particle diameter of the colorant is not less than 3 μm, the distribution of particle diameter of agglomerated particles is deteriorated to disadvantage.

As the electrolyte to be used at the second step of the present invention there may be used any of organic salts and inorganic salts. Preferably, a monovalent or higher X metal salt is used. Specific examples of such a salt include NaCl, KCl, LiCl, $Na_2SO_4$, $K_2SO_4$, $Li_2SO_4$, $MgCl_2$, $CaCl_2$, $MgSO_4$, $CaSO_4$, $ZnSO_4$, $Al_2(SO_4)_3$, and $Fe_2(SO_4)_3$.

The amount of the electrolyte to be added may change depending on its kind. In practice, however, the electrolyte is used in an amount of from 0.1 to 50 parts by weight, preferably from 0.2 to 40 parts by weight, more preferably from 0. 3 to 30 parts by weight based on 100 parts by weight of the solid content of polymer used. If the amount of the electrolyte to be added falls below 0.1 part by weight, the agglomeration reaction proceeds so slowly that fine particles having a diameter of not more than 1 μm are left behind after agglomeration reaction or the average particle diameter of the aggregates thus obtained is not more than 3 μm. Such aggregates are not appropriate as toner. On the contrary, if the amount of the electrolyte to be added exceeds 50 parts by weight, the agglomeration reaction proceeds too rapidly to control. The resulting aggregates contain coarse particles having a particle diameter of not less than 25 μm or have an irregular amorphous form.

During the addition of the electrolyte, the temperature of the mixed dispersion is preferably kept to a range of not higher than 40° C., more preferably not higher than 30° C., even more preferably not higher than 20° C. If the temperature of the mixed dispersion exceeds 40° C. during the addition of the electrolyte, rapid agglomeration occurs, making it difficult to control the particle diameter or giving particles having a low bulk density.

The average particle diameter of the mixed dispersion obtained by the addition of the electrolyte is normally not more than 3 μm, preferably not more than 2 μm, more preferably not more than 1 μm. If the average particle diameter of the mixed dispersion exceeds 3 μm, the aggregates obtained at the subsequent step have a grape-like form, providing a toner having too low a strength.

Further, a particulate wax may be present at the second step to produce a mixture of particles as necessary. The particulate wax employable herein may be the same as or different from that used in the seeded polymerization mentioned above.

At the third step of the present invention, the mixed dispersion which has been obtained up to the second step is heated with stirring to produce aggregates. The stirring of the mixed dispersion may be effected in a reaction vessel equipped with a known agitator such as paddle agitator, anchor agitator, three-plate backward agitator and maxblend agitator or by means of a homogenizer, homomixer, Henschel mixer or the like.

At the third step it is preferable that a particulate charge control agent is added, because of a good triboelectricity and a good triboelectricity stability.

As the charge control agent there may be used any known charge control agents, singly or in combination. Taking into account the adaptability to color toner (charge control agent itself is colorless or has a light color and hence doesn't impair the color tone of the toner), a quaternary ammonium salt compound is preferably used as a positively-charging charge control agent and a metal salt or metal complex of salicylic acid or alkylsalicylic acid with chromium, zinc or aluminum, a metal salt or metal complex of benzylic acid, amide compound, phenol compound, naphthol compound, phenolamide compound, etc. are preferably used as a negatively-charging charge control agent. The amount of the charge control agent to be used may be determined by the determined chargeability. In practice, however, it is normally from 0.01 to 10 parts by weight, preferably from 0.1 to 10 parts by weight based on 100 parts by weight of the binder resin used.

The growth of particle diameter by the agglomeration reaction at the third step proceeds until particles having a size substantially the same as that of the particulate toner are obtained. By controlling the pH value and temperature of the dispersion, it is made relatively easy to control the particle diameter of aggregates.

The pH value of the dispersion at the third step changes with the kind and amount of the emulsifying agent used and the desired particle diameter of the toner and thus cannot be unequivocally defined. In practice, however, if an anionic surface active agent is mainly used, the pH value of the dispersion is normally from 2 to 6. If a cationic surface active agent is mainly used, the pH value of the dispersion is normally from 8 to 12.

In the present invention, it is preferred that the mixing at the second step is effected at a temperature of not higher than 40° C. and the agglomeration at the third step is effected at a temperature of from not lower than 40° C. to not higher than the glass transition temperature (Tg) of the polymer plus 20° C.

The reaction temperature is preferably the glass transition temperature (abbreviated as "Tg") of the resin plus 20° C. The glass transition temperature of the resin can be measured by means of a differential scanning calorimeter (DSC). The reaction temperature is more preferably from Tg to (Tg+10° C.). If the reaction temperature exceeds (Tg+20° C.), the particle diameter of aggregates can be hardly controlled to a desired range, making it easy to produce coarse particles.

Referring to the agglomeration reaction, the dispersion is kept at the desired temperature for at least 10 minutes, preferably not less than 20 minutes, to produce a particulate toner having a desired particle diameter. The dispersion may be heated to the desired temperature at a constant rate or stepwise.

Further, in order to enhance the stability of the aggregates having a toner size obtained at the third step, a step of causing the fusion of agglomerated particles to each other at a temperature of from (Tg+20° C.) to (Tg+80° C.) may be added. In general, the fusion of the particles to each other proceeds further during this step, making it possible to round the shape of the toner particles or control the shape of the toner particles as necessary. This step is normally effected for 1 hour to 24 hours, preferably from 2 hours to 10 hours.

In the preparation of the toner of the present invention, the substantial growth of the particle diameter of the aggregates to the final toner particle diameter is followed by the addition of the same or different kind of a binder resin emulsion that causes particles to be attached to the surface of the toner particles, making it possible to modify the properties of the toner in the vicinity of the surface of the aggregates. For example, by causing a resin having a high glass transition temperature to be attached to the surface of the toner particles, the storage stability of the aggregates can be enhanced. Further, by causing a charge control agent or a particulate resin containing a charge control agent to be attached to the surface of the toner particles, the triboelectricity of the toner can be improved.

The toner according to the present invention can be used with an additive such as fluidity improver as necessary. Specific examples of such a fluidity improver include hydrophobic silica powder, titanium oxide powder, aluminum oxide powder, and magnesium oxide powder. Such a fluidity improver is normally used in an amount of from 0.01 to 5 parts by weight, preferably from 0.1 to 3 parts by weight based on 100 parts by weight of the binder resin used.

Further, the toner according to the present invention may have an inorganic fine powder such as magnetite, ferrite, cerium oxide, strontium titanate and electrically conductive titania or a resistivity adjustor or lubricant such as styrene resin, acrylic resin, zinc stearate and lithium stearate incorporated therein as an internal or external additive. The amount of such an additive to be added may be properly predetermined depending on the desired properties. In practice, however, it is preferably from 0.05 to 10 parts by weight based on 100 parts by weight of the binder resin used.

The toner for the development of an electrostatic image of the present invention may be in the form of either two-component developer or non-magnetic one-component developer. In particular, in the form of non-magnetic one-component developer, the toner of the present invention shows a good triboelectricity and a good triboelectricity stability. The toner of the present invention, if used as a two-component developer, may have any known carrier such as magnetic material such as iron powder, magnetite powder, ferrite powder, material obtained by coating the surface of such a magnetic material with a resin and magnetic carrier incorporated therein. As the coating resin to be used in the resin-coated carrier there may be used styrene resin, acrylic resin, styrene-acryl copolymer resin, silicone resin, modified silicone resin, fluororesin or mixture thereof.

The present invention will be further described in the following examples, but the present invention should not be construed as being limited thereto.

The term "parts" as used hereinafter is meant to indicate "parts by weight". For the measurement of the average particle diameter and molecular weight of the polymer particles, the following methods were used. Average particle diameter: Microtrack UPA produced by NIKKISO CO., LTD. or Coulter Multisizer II produced by Coulter Inc. was used.

Distribution of particle diameter: coefficient variation (CV %) measured by Coulter Multisizer II $$CV=(SD\times 100)/\overline{X}(\%)$$

SD: standard deviation $\overline{X}$: diameter

Weight-average molecular weight: Gel permeation chromatography (GPC) was employed. (Solvent: THF; calibration curve: standard polystyrene)

The toner obtained was subjected to fixing test according to the following method.

A recording paper having an unfixed toner image supported thereon was prepared. The recording paper was carried into the fixing nip through a pair of heated rolls, the surface temperature of which was varied between 100° C. and 190° C. The recording paper discharged from the fixing nip was then observed for fixing conditions. The temperature range within which the heated rolls undergo no toner offset during fixing and the toner which has been fixed to the recording paper is sufficiently bonded to the recording paper is defined as fixing temperature range. Supposing that the lower limit of the fixing temperature at which no offset occurs is TL and the upper limit of the fixing temperature at which no offset occurs is TU, the value obtained by subtracting TL from TU is the width of fixing temperature. As the fixing machine there was used one described in the following method 1 or 2.

(Method 1) The heated rolls in the fixing machine has a releasing layer made of FEP (tetrafluoroethylene-hexafluoropropylene copolymer). For the evaluation of fixing temperature, the nip width is predetermined to 5 mm.

(Method 2) The heated rolls in the fixing machine has a releasing layer made of PFA (tetrafluoroethylene-perfluoroalkyl vinyl ether copolymer). For the evaluation of fixing temperature, the nip width is predetermined to 4 mm.

EXAMPLE 1

Preparation of Primary Polymer Particles

Into a glass reaction vessel equipped with an agitator, a heating condenser, a concentrating apparatus and an apparatus for charging starting materials and auxiliaries were charged the following wax emulsion and desalted water which were then heated to a temperature of 90° C. in a flow of nitrogen.

| | | |
|---|---|---|
| Behenyl behenate emulsion (average particle diameter: 0.4 μm) | 21.3 | parts (as calculated in terms of solid content) |
| Deionized water (including water content in wax emulsion) | 404.9 | parts |

Thereafter, to the mixture were added the following monomers, aqueous solution of emulsifying agent and polymerization initiators. The reaction mixture was then allowed to undergo emulsion polymerization for 5 hours.

| | | |
|---|---|---|
| (Monomer) | | |
| Styrene | 64 | parts |
| Butyl acrylate | 36 | parts |
| Acrylic acid | 3 | parts |
| Trichlorobromomethane | 1.3 | parts |
| (Aqueous solution of emulsifying agent) | 12 | parts |
| (Polymerization initiator) | | |
| 2% Aqueous solution of hydrogen peroxide | 43.0 | parts |
| 2% Aqueous solution of ascorbic acid | 43.0 | parts |

The polymerization product was cooled to obtain an opaque white emulsion of primary polymer particles (hereinafter referred to as "polymer emulsion A").

The emulsion thus obtained contained a particulate polymer having an average particle diameter of 257 nm and a weight-average molecular weight of 42,000. A section of the emulsion particle was observed under TEM. As a result, the wax was observed encapsulated in the polymer.

Formation of Aggregates (Preparation of Toner), Evaluation

| | | |
|---|---|---|
| Polymer emulsion A | 120 | parts (as calculated in terms of solid content) |
| Charge control agent Bontron S-34 (10% dispersion) | 0.65 | part (as calculated in terms of solid content) |
| Aqueous dispersion of phthalocyanine blue | 6.7 | parts (as calculated in terms of solid content) |

The foregoing mixture, added aqueous solution of sodium chloride in an amount of 9 parts (as calculated in terms of solid content), was kept at a temperature of 20° C. for 1.5 hours while being dispersed and stirred by a disperser. Thereafter, the mixture was heated to a temperature of 45° C. where it was then kept with stirring for 0.5 hour. In order to enhance the bond strength of aggregates, the mixture was heated to a temperature of 95° C. where it was then kept for 5 hours. The slurry of aggregates thus obtained was cooled, filtered through a Kiriyama funnel, washed with water, and then freeze-dried to obtain a toner having an average particle diameter of 6.7 μm. The toner thus obtained was then evaluated according to the foregoing method 2. As a result, the toner was fixed at a temperature of from 115° C. to not lower than 190° C.

EXAMPLE 2

A polymer emulsion and a particulate toner were prepared in the same manner as in Example 1 except that a purified paraffin emulsified with a nonionic surface active agent (average particle diameter: 0.42 μm) was used as a wax emulsion to prepare a polymer emulsion (hereinafter referred to as "polymer emulsion B") . The particulate toner thus obtained had an average particle diameter of 6.1 μm. The toner was then evaluated according to the foregoing method 2. As a result, the toner was fixed at a temperature of from 100° C. to not lower than 190° C.

EXAMPLE 3

Preparation of Primary Polymer Particles

Into a glass reaction vessel equipped with an agitator, a heating condenser, a concentrating apparatus and an apparatus for charging starting materials and auxiliaries were charged the following wax emulsion and desalted water which were then heated to a temperature of 90° C. in a flow of nitrogen.

| | | |
|---|---|---|
| Behenyl behenate emulsion (average particle diameter: 0.8 μm) | 10.6 | parts (as calculated in terms of solid content) |
| Deionized water (including water content in wax emulsion) | 352.3 | parts |

Thereafter, to the mixture were added the following monomers, aqueous solution of emulsifying agent and polymerization initiators. The reaction mixture was then allowed to undergo emulsion polymerization for 5 hours.

| | | |
|---|---|---|
| (Monomer) | | |
| Styrene | 75 | parts |
| Butyl acrylate | 25 | parts |
| Acrylic acid | 3 | parts |
| Trichlorobromomethane | 0.5 | part |
| (Aqueous solution of emulsifying agent) | 26 | parts |
| (Polymerization initiator) | | |
| 2% Aqueous solution of hydrogen peroxide | 43.2 | parts |
| 2% Aqueous solution of ascorbic acid | 43.2 | parts |

The polymerization product was cooled to obtain an opaque white emulsion of primary polymer particles (hereinafter referred to as "polymer emulsion C").

The emulsion thus obtained contained a particulate polymer having an average particle diameter of 244 nm and a weight-average molecular weight of 59,000. A section of the emulsion particle was observed under TEM. As a result, the wax was observed encapsulated in the polymer.

Formation of Aggregates (Preparation of Toner), Evaluation

| | | |
|---|---|---|
| Polymer emulsion C | 110 | parts (as calculated in terms of solid content) |
| Charge control agent: phenolamide compound (20% dispersion) | 0.65 | part (as calculated in terms of solid content) |
| Aqueous dispersion of phthalocyanine blue | 6.7 | parts (as calculated in terms of solid content) |

The foregoing mixture, added aqueous solution of aluminum sulfate in an amount of 0.4 part (as calculated in terms of solid content), was kept at a temperature of 20° C. for 1.5 hours while being dispersed and stirred by a disperser. Thereafter, the mixture was heated to a temperature of 60° C. where it was then kept with stirring for 0.5 hour. In order to enhance the bond strength of aggregates, the mixture was heated to a temperature of 95° C. where it was then kept for 5 hours. The slurry of aggregates thus obtained was cooled, filtered through a Kiriyama funnel, washed with water, and then freeze-dried to obtain a toner. The toner thus obtained was then evaluated according to the foregoing method 2. As a result, the toner was fixed at a temperature of from 140° C. to not lower than 190° C.

COMPARATIVE EXAMPLE 1

Preparation of Primary Polymer Particles

The emulsion polymerization procedure of Example 3 was followed except that into the glass reaction vessel equipped with an agitator, a heating condenser, a concentrating apparatus and an apparatus for charging starting materials and auxiliaries were charged the following wax emulsion and desalted water.

| | |
|---|---|
| Sodium dodecylbenzenesulfonate | 0.3 part |
| Deionized water (including water content in wax emolsion) | 315.3 parts |

The reaction mixture was allowed to undergo polymerization reaction, and then cooled to obtain an opaque white emulsion of primary polymer particles (hereinafter referred to as "polymer emulsion D").

The emulsion thus obtained contained a particulate polymer having an average particle diameter of 219 nm and a weight-average molecular weight of 60,000.

Formation of Aggregates (Preparation of Toner), Evaluation

A particulate toner was prepared in the same manner as in Example 3 except that the polymer emulsion C was replaced by 10 parts (as calculated in terms of solid content) of a behenyl behenate emulsion (average particle diameter: 0.44 μm) obtained by emulsifying 100 parts (as calculated in terms of solid content) of the polymer emulsion D with sodium dodecylbenzenesulfonate. The toner thus obtained contained polymer particles having an average particle diameter of 6.0 μm. The toner was then evaluated according to the foregoing method 2. As a result, the toner was fixed at a temperature of from 152° C. to not lower than 190° C.

The comparison of the toner of Example 3 having a wax encapsulated therein with the toner of Comparative Example 1 having a wax co-agglomerated during agglomeration shows that the toner of Comparative Example 1 exhibits a higher lower limit of fixing temperature TL and a smaller fixing temperature width than that of Example 3.

COMPARATIVE EXAMPLE 2

A particulate toner was prepared in the same manner as in Example 3 except that the polymer emulsion C was replaced by 100 parts (as calculated in terms of solid content) of the polymer emulsion D. The particulate toner thus obtained had an average particle diameter of 5.3 μm. The toner was then evaluated according to the foregoing method 2. As a result, the toner was fixed at a temperature of from 160° C. to not lower than 190° C.

The comparison of the toner of Example 3 having a wax encapsulated therein with the toner of Comparative Example 2 free of wax shows that the toner of Comparative Example 2 exhibits a higher lower limit of fixing temperature TL and a smaller fixing temperature width than that of Example 3.

EXAMPLE 4

A polymer emulsion E and a particulate toner were prepared in the same manner as in Example 3 except that the monomers used were changed as follows.

| (Monomer) | |
|---|---|
| Styrene | 79 parts |
| Butyl acrylate | 21 parts |
| Acrylic acid | 3 parts |
| Trichlorobromomethane | 0.5 part |

The particulate toner thus obtained had an average particle diameter of 8.1 μm. The toner was then evaluated according to the foregoing method 2. As a result, the toner was fixed at a temperature of from 148° C. to not lower than 190° C.

COMPARATIVE EXAMPLE 3

A polymer emulsion F and a particulate toner were prepared in the same manner as in Comparative Example 1 except that the monomers used were changed as follows.

| (Monomer) | |
|---|---|
| Styrene | 79 parts |
| Butyl acrylate | 21 parts |
| Acrylic acid | 3 parts |
| Trichlorobromomethane | 0.5 part |

The particulate toner thus obtained had an average particle diameter of 5.9 μm. The toner was then evaluated according to the foregoing method 2. As a result, the toner was fixed at a temperature of from 168° C. to not lower than 190° C.

The comparison of the toner of Example 4 having a wax encapsulated therein with the toner of Comparative Example 3 having a wax co-agglomerated during agglomeration shows that the toner of Comparative Example 3 exhibits a higher lower limit of fixing temperature TL and a smaller fixing temperature width than that of Example 4.

COMPARATIVE EXAMPLE 4

A particulate toner was prepared in the same manner as in Example 4 except that the polymer emulsion E was replaced by 100 parts (as calculated in terms of solid content) of the polymer emulsion F. The particulate toner thus obtained had an average particle diameter of 4.9 μm. The toner was then evaluated according to the foregoing method 2. As a result, the toner was fixed at a temperature of from 170° C. to not lower than 190° C.

The comparison of the toner of Example 4 having a wax encapsulated therein with the toner of Comparative Example 4 free of wax shows that the toner of Comparative Example 4 exhibits a higher lower limit of fixing temperature TL and a smaller fixing temperature width than that of Example 4.

EXAMPLE 5

Preparation of Primary Polymer Particles

Into a glass reaction vessel equipped with an agitator, a heating condenser, a concentrating apparatus and an apparatus for charging starting materials and auxiliaries were charged the following wax emulsion and desalted water which were then heated to a temperature of 90° C. in a flow of nitrogen.

| | | |
|---|---|---|
| Behenyl behenate emulsion (average particle diameter: 0.42 μm) | 21.3 | parts (as calculated in terms of solid content) |
| Sodium dodecylbenzenesulfonate | 0.5 | part |
| Deionized water (including water content in wax emulsion) | 396.9 | parts |

Thereafter, to the mixture were added the following monomers, aqueous solution of emulsifying agent and polymerization initiators. The reaction mixture was then allowed to undergo emulsion polymerization for 5 hours.

| | | |
|---|---|---|
| (Monomer) | | |
| Styrene | 72 | parts |
| Butyl acrylate | 28 | parts |
| Acrylic acid | 3 | parts |
| Trichlorobromomethane | 0.5 | part |
| Aqueous solution of emulsifying agent | 26 | parts |
| (Polymerization initiator) | | |
| 2% Aqueous solution of hydrogen peroxide | 43.2 | parts |
| 2% Aqueous solution of ascorbic acid | 43.2 | parts |

The polymerization product was cooled to obtain an opaque white emulsion of primary polymer particles (hereinafter referred to as “polymer emulsion G”).

The emulsion thus obtained contained a particulate polymer having an average particle diameter of 144 nm and a weight-average molecular weight of 74,000. A section of the emulsion particle was observed under TEM. As a result, the wax was observed encapsulated in the polymer.

The emulsion polymerization procedure of the polymer emulsion G was followed except that into the glass reaction vessel equipped with an agitator, a heating condenser, a concentrating apparatus and an apparatus for charging starting materials and auxiliaries was charged the following wax emulsion. Thus, an emulsion H was obtained.

| | | |
|---|---|---|
| Alkyl-modified silicone emulsion (average particle diameter: 0.27 μm) | 21.1 | parts (as calculated in terms of solid content) |
| Deionized water (including water content in wax emulsion) | 392.2 | parts |

The emulsion thus obtained contained a particulate polymer having an average particle diameter of 284 nm and a weight-average molecular weight of 150,000. A section of the emulsion particle was observed under TEM. As a result, the wax was observed encapsulated in the polymer.

Formation of Aggregates (Preparation of Toner), Evaluation

| | | |
|---|---|---|
| Polymer emulsion G | 60 | parts (as calculated in terms of solid content) |
| Polymer emulsion H | 60 | parts (as calculated in terms of solid content) |
| Charge control agent Bontron S-34 (10% dispersion) | 0.65 | part (as calculated in terms of solid content) |
| Aqueous dispersion of phthalocyanine blue | 6.7 | parts (as calculated in terms of solid content) |

The foregoing mixture was kept at a temperature of 20° C. for 1.5 hours while being dispersed and stirred by a disperser. Thereafter, the mixture was heated to a temperature of 55° C. where it was then kept with stirring for 0.5 hour. In order to enhance the bond strength of aggregates, the mixture was heated to a temperature of 95° C. where it was then kept for 5 hours. The slurry of aggregates thus obtained was cooled, filtered through a Kiriyama funnel, washed with water, and then freeze-dried to obtain a toner. The particulate toner thus obtained had an average particle diameter of 5.9 μm. The toner thus obtained was then evaluated according to the foregoing method 1. As a result, the toner was fixed at a temperature of from 115° C. to 187° C.

EXAMPLE 6

A polymer emulsion (hereinafter referred to as “polymer emulsion I”) and a particulate toner were prepared in the same manner as in Example 5 except that as the wax emulsion there was used an emulsion by emulsifying glyceride montanate with a nonionic surface active agent (average particle diameter: 0.27 μm). The particulate toner thus obtained was then evaluated according to the foregoing method 1. As a result, the toner was fixed at a temperature of from 120° C. to 190° C.

EXAMPLE 7

A polymer emulsion (hereinafter referred to as “polymer emulsion J”) and a particulate toner were prepared in the same manner as in Example 5 except that as the wax emulsion there was used a polyethylene wax emulsion (HYTEC E5403B, produced by TOHO CHEMICAL INDUSTRY CO., LTD.; average particle diameter: 0.04 μm) and as the monomers there were used the following compounds. The particulate toner thus obtained was then evaluated according to the foregoing method 1. As a result, the toner was fixed at a temperature of 138° C.

| (Monomer) | |
|---|---|
| Styrene | 80 parts |
| Butyl acrylate | 20 parts |
| Acrylic acid | 3 parts |
| Trichlorobromomethane | 1 part |
| (Polymerization initiator) | |
| 2% Aqueous solution of hydrogen peroxide | 43.4 parts |
| 2% Aqueous solution of ascorbic acid | 43.4 parts |

EXAMPLE 8

A polymer emulsion (hereinafter referred to as "polymer emulsion K") and a particulate toner were prepared in the same manner as in Example 7 except that as the wax emulsion there was used a polyethylene wax emulsion (HYTEC E103N, produced by TOHO CHEMICAL INDUSTRY CO., LTD.; average particle diameter: 0.03 μm). The particulate toner thus obtained was then evaluated according to the foregoing method 1. As a result, the toner was fixed at a temperature of 140° C.

EXAMPLE 9

A polymer emulsion (hereinafter referred to as "polymer emulsion L") and a particulate toner were prepared in the same manner as in Example 7 except that as the wax emulsion there was used an emulsion by emulsifying a mixture of glyceride montanate and behenyl behenate with a nonionic surface active agent (average particle diameter: 0.43 μm). The particulate toner thus obtained was then evaluated according to the foregoing method 1. As a result, the toner was fixed at a temperature of from 140° C. to 190° C.

The polymer emulsions A to L used in the foregoing examples are set forth in the table below.

TABLE 1

(Primary polymer particles)

| Polymer emulsion | Wax | Amount of wax | Average particle diameter (nm) | Weight-average molecular weight |
|---|---|---|---|---|
| A | Behenyl behenate | 20 parts | 257 | 42,000 |
| B | Purified paraffin | 20 parts | 222 | 74,000 |
| C | Behenyl behenate | 10 parts | 244 | 59,000 |
| D | None | — | 219 | 60,000 |
| E | Behenyl behenate | 10 parts | 254 | 58,000 |
| F | None | — | 227 | 61,000 |
| G | Behenyl behenate | 20 parts | 144 | 74,000 |
| H | Alkyl-modified silicone | 20 parts | 284 | 150,000 |
| I | Glyceride montanate | 20 parts | 150 | 59,000 |
| J | Polyethylene wax (HYTEC E5403B) | 20 parts | 100 | 53,000 |
| K | Polyethylene wax (HYTEC E103N) | 20 parts | 90 | 44,000 |
| L | Glyceride montanate/ behenyl behenate | 20 parts | 180 | 53,000 |

It can be seen in the foregoing examples that the encapsulation of a wax in primary polymer particles makes it possible to give a sufficiently wide range within which no offset occurs in the heated roll fixing process, too.

In other words, Example 3 exhibits a fixing temperature range as wide as from 140° C. to not lower than 190° C. due to the encapsulation of wax while Comparative Example 1, in which the same amount of a wax is coagglomerated, exhibits a fixing temperature range of from 152° C. to not lower than 190° C. and hence a higher lower limit of fixing temperature. Thus, it was found herein that the fixing temperature differs with how the wax is present even if the same wax is used.

In Comparative Example 2, a toner synthesized in the same manner as in Example 3 except that no wax was used was evaluated. As a result, the toner exhibited a fixing temperature range of from 160° C. to not lower than 190° C. and hence an even higher lower limit of fixing temperature and an even smaller fixing temperature range.

It was thus found that the incorporation of a wax in a toner makes it possible to lower the lower limit of fixing temperature and increase the fixing temperature range and this effect can be exerted remarkably when the wax is encapsulated in the toner.

Referring to the case where the monomer composition, i.e., Tg of resin is different, Example 4 exhibits a fixing temperature range of from 148° C. to not lower than 190° C. due to the encapsulation of a wax while Comparative Example 3, in which the same amount of a wax is coagglomerated, exhibits a fixing temperature range of from 168° C. to not lower than 190° C. and hence a slightly higher lower limit of fixing temperature. It was thus confirmed that the fixing temperature differs with how the wax is present even if the same wax is used.

In Comparative Example 4, a toner synthesized in the same manner as in Example 4 except that no wax was used was evaluated. As a result, the toner exhibited a fixing temperature range of from 170° C. to not lower than 190° C. and hence an even higher lower limit of fixing temperature and an even smaller fixing temperature range.

EXAMPLE 10

Seed Emulsion Polymerization

Into a glass reaction vessel equipped with an agitator, a heating condenser, a concentrating apparatus and an apparatus for charging starting materials and auxiliaries were charged the wax emulsion and desalted water in the following amounts which were then heated to a temperature of 90° C. in a flow of nitrogen.

| | |
|---|---|
| Behenyl behenate emulsion (average particle diameter 0.4 μm) | 21.3 parts |
| Deionized water | 392 parts |

Thereafter, to the mixture were added the following monomers, aqueous solution of emulsifying agent and polymerization initiators. The reaction mixture was then allowed to undergo emulsion polymerization for 6.5 hours.

| (Monomer) | |
|---|---|
| Styrene | 64 parts |
| Butyl acrylate | 36 parts |
| Acrylic acid | 3 parts |
| Trichlorobromomethane | 0.5 part |
| Aqueous solution of emulsifying agent | 20 parts |

-continued

| | |
|---|---|
| (Polymerization initiator) | |
| 2% Aqueous solution of hydrogen peroxide | 37 parts |
| 2% Aqueous solution of ascorbic acid | 37 parts |

The polymerization product was cooled to obtain an opaque white emulsion of primary polymer particles (hereinafter referred to as "polymer emulsion M"). The polymer dispersion thus obtained contained a particulate polymer having a weight-average molecular weight of 71,000, an average particle diameter of 252 nm as determined by UPA and Tg of 45° C. A section of the emulsion particle was observed under TEM. As a result, the wax was observed encapsulated in the polymer.

Formation of Aggregates (Preparation of Toner)

| | | |
|---|---|---|
| Polymer emulsion M | 120 | parts (as calculated in terms of solid content) |
| Charge control agent: phenol amide compound | 0.65 | part (as calculated in terms of solid content) |
| Aqueous dispersion of phthalocyanine blue | 6.7 | parts (as calculated in terms of solid content) |

To the foregoing mixture was added an aqueous solution of NaCl (9 parts as calculated in terms of solid content) at a temperature of 20° C. while being dispersed and stirred by a disperser. After addition of an aqueous solution of NaOH, a diameter of the mixture was 1.8 μm. Thereafter, the mixture was heated to a temperature of 45° C. where it was then kept with stirring for 0.5 hour. In order to enhance the bond strength of aggregates, the mixture was heated to a temperature of 95° C. where it was then kept for 5 hours. The slurry of aggregates thus obtained was cooled, filtered through a Kiriyama funnel, washed with water, and then freeze-dried to obtain a toner. The particulate toner thus obtained had a volume-average particle diameter of 9.0 μm and CV value of 28.9% as determined by means of a Coulter counter.

The toner thus obtained was then evaluated for fixability. As a result, the toner was fixed at a temperature of from 125° C. to not lower than 190° C. according to the foregoing method 1 and at a temperature of from 122° C to not lower than 190° C. according to the foregoing method 2.

EXAMPLE 11

Seed Emulsion Polymerization

Into a glass reaction vessel equipped with an agitator, a heating condenser, a concentrating apparatus and an apparatus for charging starting materials and auxiliaries were charged the wax emulsion and desalted water in the following amounts which were then heated to a temperature of 90° C. in a flow of nitrogen.

| | |
|---|---|
| Behenyl behenate emulsion (average particle diameter 0.4 μm) | 11.9 parts |
| Deionized water | 353 parts |

Thereafter, to the mixture were added the following monomers and polymerization initiators. The reaction mixture was then allowed to undergo emulsion polymerization for 6.5 hours.

| | |
|---|---|
| (Monomer) | |
| Styrene | 75 parts |
| Butyl acrylate | 25 parts |
| Acrylic acid | 3 parts |
| Trichlorobromomethane | 0.5 part |
| Aqueous solution of emulsifying agent | 20 parts |
| (Polymerization initiator) | |
| 2% Aqueous solution of hydrogen peroxide | 37 parts |
| 2% Aqueous solution of ascorbic acid | 37 parts |

The polymerization product was cooled to obtain an opaque white polymer dispersion (hereinafter referred to as "polymer emulsion O"). The polymer dispersion thus obtained contained a particulate polymer having a weight-average molecular weight of 59,000, an average particle diameter of 244 nm as determined by UPA and Tg of 59° C.

Formation of Aggregates (Preparation of Toner)

| | | |
|---|---|---|
| Polymer dispersion O | 110 | parts (as calculated in terms of solid content) |
| Charge control agent: phenolamide compound | 0.65 | part (as calculated in terms of solid content) |
| Aqueous dispersion of phthalocyanine blue | 6.7 | parts (as calculated in terms of solid content) |

To the foregoing mixture was added $Al_2(SO_4)_3$ as an electrolyte in an amount of 0.4 part (as calculated in terms of solid content) while being dispersed and stirred by a disperser. Thereafter, the mixture was heated to a temperature of 60° C. where it was then kept with stirring for 0.5 hour. In order to enhance the bond strength of aggregates, the mixture was adjusted to pH 5 or higher, and then heated to a temperature of 95° C. where it was then kept for 5 hours. The slurry thus obtained was then processed in the same manner as in Example 10 to obtain a particulate toner. The particulate toner thus obtained had a volume-average particle diameter of 11.7 μm and CV value of 28.3 % as determined by means of a Coulter counter.

The toner thus obtained was then evaluated for fixability. As a result, the toner was fixed at a temperature of from 128° C. to not lower than 190° C. according to the foregoing method 1 and at a temperature of from 140° C. to not lower than 190° C. according to the foregoing method 2.

EXAMPLE 12

Seed Emulsion Polymerization

A polymer dispersion (polymer emulsion P) was prepared in the same manner as in Example 11 except that 79 parts of styrene and 21 parts of butyl acrylate were used. The polymer emulsion P thus obtained exhibited a weight-average molecular weight of 58,000, an average particle diameter of 254 nm as determined by UPA and Tg of 63° C.

Formation of Aggregates (Preparation of Toner)

A particulate toner was prepared in the same manner as in Example 11 except that the polymer emulsion P was used, $Al_2(SO_4)_3$ was added as an electrolyte in an amount of 0.3 part (as calculated in terms of solid content) and the reaction mixture was heated to a temperature of 65° C. The particulate toner thus obtained exhibited a volume-average particle diameter of 8.0 μm and CV value of 33.3% as determined by means of a Coulter counter.

The toner thus obtained was then evaluated for fixability. As a result, the toner was fixed at a temperature of from 140° C. to not lower than 190° C. according to the foregoing method 1 and at a temperature of from 148° C. to not lower than 190° C. according to the foregoing method 2.

EXAMPLE 13

A particulate toner was obtained in the same manner as in Example 10 except that the pH value of the mixture was adjusted to 4 before the addition of NaCl as an electrolyte in an amount of 5 parts (as calculated in terms of solid content) during the preparation of a toner involving the agglomeration of the polymer emulsion M with a pigment and a charge control agent. The particulate toner thus obtained had a volume-average particle diameter of 3.8 μm and a number-average particle diameter of 2.9 μm.

EXAMPLE 14

A particulate toner was obtained in the same manner as in Example 13 except that NaCl was added in an amount of 10 parts (as calculated in terms of solid content). The particulate toner thus obtained had a volume-average particle diameter of 6.1 μm and a number-average particle diameter of 5.0 μm.

COMPARATIVE EXAMPLE 5

The agglomeration procedure of Example 10 was followed except that no electrolytes were added during the preparation of a toner involving the agglomeration of the polymer emulsion M with a pigment and a charge control agent. As a result, the agglomeration of particles didn't proceed. Thus, the desired particulate toner was not obtained.

COMPARATIVE EXAMPLE 6

Seed Emulsion Polymerization 350 parts of deionized water containing 0.5 part of DBS(sodium dodecylbenzenesulfonate) were heated to a temperature of 90° C. Thereafter, to the mixture were added the following monomers, aqueous solution of emulsifying agent and polymerization initiators. The reaction mixture was then allowed to undergo emulsion polymerization for 6.5 hours.

| | |
|---|---|
| (Monomer) | |
| Styrene | 72 parts |
| Butyl acrylate | 28 parts |
| Acrylic acid | 3 parts |
| Trichlorobromomethane | 0.8 part |
| Aqueous solution of emulsifying agent | 20 parts |
| (Polymerization initiator) | |
| 2% Aqueous solution of hydrogen peroxide | 37 parts |
| 2% Aqueous solution of ascorbic acid | 37 parts |

The polymer dispersion thus obtained (polymer emulsion Q) contained a particulate polymer having a weight-average molecular weight of 38,000, an average particle diameter of 187 nm as determined by UPA and Tg of 54° C.

Formation of Aggregates (Preparation of Toner)

| | |
|---|---|
| Polymer dispersion Q | 100 parts (as calculated in terms of solid content) |
| Charge control agent: phenolamide compound | 0.65 part (as calculated in terms of solid content) |
| Aqueous dispersion of phthalocyanine blue | 6.7 parts (as calculated in terms of solid content) |
| Behenyl behenate emulsion (average particle diameter 0.4 μm) | 20 parts (as calculated in terms of solid content) |

To the foregoing mixture was added $Al_2(SO_4)_3$ as an electrolyte in an amount of 2 parts (as calculated in terms of solid content) while being dispersed and stirred by a disperser at a temperature of not higher than 20° C. Thereafter, the mixture was heated to a temperature of 55° C. to cause the progress of agglomeration. Thereafter, the slurry thus obtained was processed in the same manner as in Example 10 to obtain a particulate toner. The particulate toner thus obtained had a volume-average particle diameter of 8.9 μm as determined by means of a Coulter counter but a number-average particle diameter as small as 4.2 and a wide distribution of particle diameter. Further, the particulate toner contained much coarse particles having a particle diameter of not less than 10 μm. The standard deviation of volume-average particle diameter was 8.7 μm (normally not more than 2 μm).

In the following examples, the triboelectricity of the toner was measured by the following method.

Triboelectricity: 10 g of the toner obtained is charged into a non-magnetic one-component development tank (Type Phaser 550 development tank produced by Kyushu Matsushita Electric Co., Ltd., equipped with rubber rollers, urethane blades, etc.). The rollers are rotated by a predetermined number. The toner on the rollers is then drawn by suction. The triboelectricity per unit volume is then determined from the triboelectricity amount and the weight of the toner thus drawn. Further, the initial triboelectricity and the triboelectricity after 10 minutes of rotation are measured to evaluate the triboelectricity stability. If the triboelectricity after 10 minutes is not less than 60% of the initial value, the triboelectricity stability is considered good (○). If the triboelectricity after 10 minutes is not less than 30% of the initial value, the triboelectricity stability is considered fair (Δ). If the triboelectricity after 10 minutes falls below 30% of the initial value, the triboelectricity stability is considered poor (X).

EXAMPLE 16

Formation of Particulate Resin

Into a glass reaction vessel equipped with an agitator, a cooling condenser, a concentrating apparatus and an apparatus for charging various starting materials and auxiliaries were charged the following wax emulsion and desalted water in the following amount which were then heated to a temperature of 90° C. in a stream of nitrogen.

| | |
|---|---|
| Behenyl behenate emulsion | 10.7 parts |
| Sodium dodecylbenzenesulfonate | 0.45 part |
| Deionized water | 416 parts |

To the mixture were then added the following monomers, aqueous solution of emulsifying agent and polymerization initiators. The mixture was then allowed to undergo emulsion polymerization for 6.5 hours.

| | |
|---|---|
| (Monomer) | |
| Styrene | 79 parts |
| Butyl acrylate | 21 parts |
| Acrylic acid | 3 parts |
| Trichlorobromomethane | 0.5 part |
| Aqueous solution of emulsifying agent | 18 parts |
| (Polymerization initiator) | |
| 8% Aqueous solution of hydrogen peroxide | 11 parts |
| 8% Aqueous solution of ascorbic acid | 11 parts |

After the termination of polymerization reaction, the reaction solution was cooled to obtain an opaque white polymer dispersion (hereinafter referred to as "polymer dispersion R".

The polymer dispersion R thus obtained exhibited a weight-average molecular weight of 104,000 and Tg of 65° C.

Formation and Evaluation of Particulate Toner

| | |
|---|---|
| Polymer dispersion R | 110 parts (as calculated in terms of solid content) |
| Aqueous dispersion of phthalocyanine blue as blue dye | 6.7 parts (as calculated in terms of solid content) |

To the foregoing mixture was then added dropwise an aqueous solution of NaCl in an amount of 20 parts (as calculated in terms of solid content) in 1 hour while being stirred by a disperser at a temperature of 20° C. Thereafter, the mixture was further stirred for 15 minutes. Thereafter, to the mixture was added dropwise 2 parts (as calculated in terms of solid content) of a 20% dispersion of phenolamide compound as a negatively charge control agent. Thereafter, the mixture was stirred for 15 minutes, and then heated with stirring to a temperature of 65° C. where it was then kept for 0.5 hour to terminate the agglomeration reaction. In order to enhance the bond strength of the aggregates, the reaction solution was heated to a temperature of 95° C. where it was then kept for 5 hours. Thereafter, the slurry of the aggregates thus obtained was cooled, filtered through a Kiriyama funnel, washed with water, and freeze-dried to obtain a toner.

The particulate toner thus obtained had a volume-average particle diameter of 6.0 μm as determined by means of a Coulter counter. The toner thus obtained was then evaluated for triboelectricity. As a result, the toner exhibited an initial triboelectricity of −14.8 μC/g and a good triboelectricity stability. The lower limit (TL) of fixing temperature of the toner was 150° C. The upper limit (TU) of fixing temperature of the toner was not lower than 200° C. Thus, the value (TU-TL) was not lower than 50° C.

While the invention has been described in detail and with reference to specific embodiments thereof, it will be apparent to one skilled in the art that various changes and modifications can be made therein without departing from the spirit and scope thereof.

What is claimed is:

1. A process for the preparation of a toner comprising an agglomerate of particles containing at least primary polymer particles, said primary polymer particles encapsulating a wax therein, which comprises:

subjecting a monomer mixture containing a monomer having an acidic or basic group to seed emulsion polymerization in the presence of a particulate wax;

mixing a dispersion of primary polymer particles thus obtained with a dispersion of particulate colorant; and causing the mixture of dispersions to agglomerate to form aggregates.

2. The preparation process according to claim 1, which further comprises adding a dispersion of particulate charge control agent to said mixture of dispersions.

3. The preparation process of claim 1, wherein said particulate wax is produced by dispersing the wax in the presence of an emulsifying agent.

4. The preparation process of claim 1, wherein said particulate wax has an average particle diameter of from 0.01 to 3 μm.

5. The preparation process of claim 1, wherein said particulate wax has an average particle diameter of from 0.03 to 1 μm.

6. The preparation process of claim 1, wherein said particulate wax has an average particle diameter of from 0.05 to 0.8 μm.

7. The preparation process of claim 1, wherein said primary polymer particles comprise a wax incorporated therein in an amount of from 1 to 40 parts by weight based on 100 parts by weight of polymer.

8. The preparation process of claim 1, wherein said particulate colorant is obtained by emulsifying the colorant in water in the presence of an emulsifying agent.

9. The preparation process of claim 1, wherein said colorant is used in an amount of from 3 to 20 parts by weight based on 100 parts by weight of polymer.

10. A preparation process according to claim 1, wherein said toner is in the form of a non-magnetic one-component developer.

* * * * *